Feb. 14, 1950 W. H. BASELT 2,497,829
SNUBBER
Filed Aug. 31, 1945 2 Sheets-Sheet 1
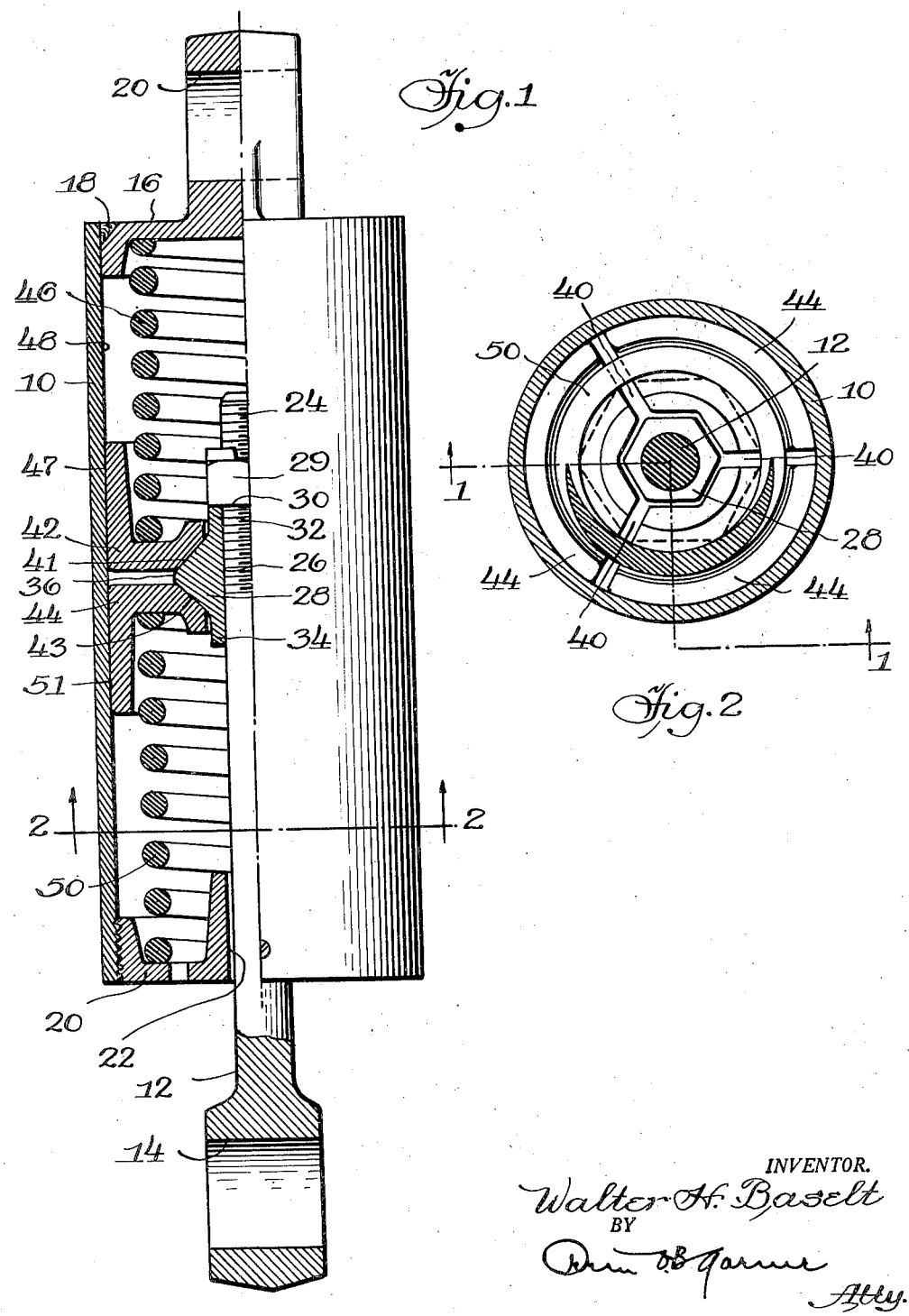
INVENTOR.
Walter H. Baselt
BY
[signature]
Atty.

Feb. 14, 1950 W. H. BASELT 2,497,829
SNUBBER
Filed Aug. 31, 1945 2 Sheets-Sheet 2
Fig. 4
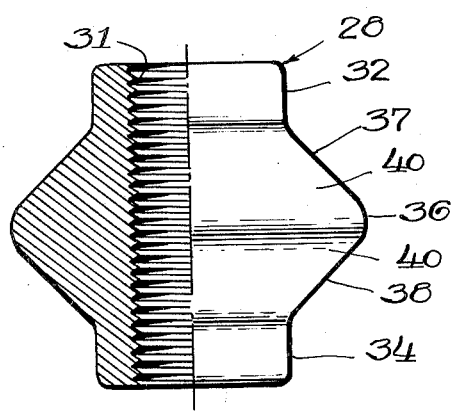
Fig. 5
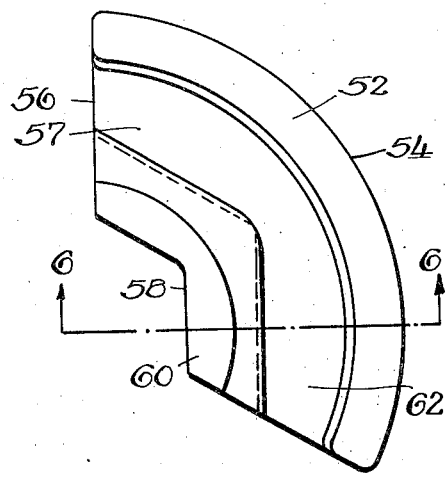
Fig. 6
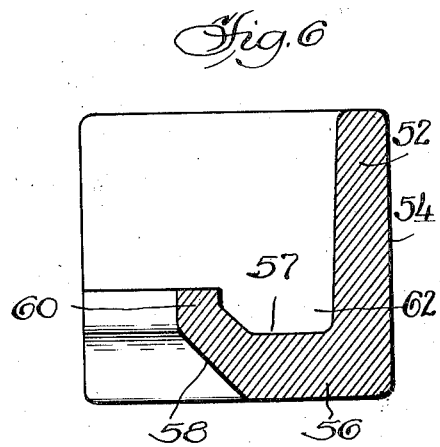
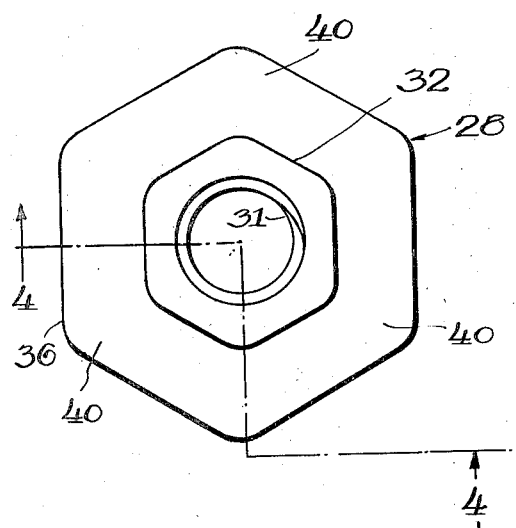
Fig. 3
INVENTOR.
Walter H. Baselt
BY
Arin O. B. Garner
Atty.

Patented Feb. 14, 1950

2,497,829

UNITED STATES PATENT OFFICE 2,497,829

SNUBBER

Walter H. Baselt, Chicago, Ill., assignor to American Steel Foundries, Chicago, Ill., a corporation of New Jersey Application August 31, 1945, Serial No. 613,838

7 Claims. (Cl. 267—9)

My invention relates to a shock absorber and more particularly to a shock absorber of the friction type especially adapted for use in conjunction with springs between two relatively movable sprung and unsprung members of a vehicle for controlling relative movement between the members.

An object of my invention is to provide a device of the character described which will produce a retarding effect proportional to the extent of movement of one member with respect to the other member and thereby effectively control relative movement of the members.

Another object of my invention is to provide a device which varies in its frictional retarding action in proportion to the extent of relative movement of the members to yieldingly resist such movement and thereby absorb impact and rebound between the sprung member and the unsprung member.

A further object of my invention is to provide a shock absorber which effects yielding opposition to separatory or approaching movement of the sprung and unsprung members of a vehicle in proportion to the extent of such movement.

A still further object of my invention is to provide a shock absorber of friction type comprising a cylinder and a plunger reciprocal therein connected respectively to the sprung and unsprung members of a vehicle, a pair of springs being disposed in the cylinder in engagement with opposite ends thereof and supporting friction shoes operatively urged thereby into wedge engagement with wedge means on the plunger and into frictional engagement with the cylinder wall, reciprocal movement of said plunger in either direction effecting further compression of one of the springs to thereby increase the frictional engagement of the associated shoe and cylinder to relative movement of the members.

A further object of my invention is to provide a friction type shock absorber comprising a cylinder and a plunger reciprocal therein connected respectively to the sprung and unsprung members of a vehicle, said plunger having wedge means in complementary engagement with friction shoes urged into engagement therewith and the cylinder by resilient means housed within the cylinder and compressed between said cylinder and said shoes, reciprocal movement of said plunger producing a frictional retarding effect proportional to the extent of said movement.

My invention comprehends a novel wedge element comprising a substantially solid block having a plurality of V-shaped diagonal wedge surfaces top and bottom, the superposed surfaces being reversely arranged with respect to each other.

My invention also comprehends a novel friction shoe comprising a friction wall having an arcuate friction surface on one side thereof and a wall projecting angularly from said friction wall at the opposite side thereof and providing a spring seat, the end of said last-mentioned wall remote from said friction wall having a diagonal V-shaped wedge surface, said walls providing positioning means for an associated coil spring.

In the drawings:

Figure 1 is a vertical longitudinal view, half in section, of my novel shock absorber, the section being taken along the line 1—1 of Figure 2;

Figure 2 is a horizontal sectional view of the device illustrated in Figure 1, the section being taken on the line 2—2 of Figure 1;

Figure 3 is an end view of the novel wedge utilized in the device illustrated in Figures 1 and 2, and Figure 4 is a side view, partly in section, of the same, the section being taken along the line 4—4 of Figure 3;

Figure 5 is a top plan view of one of the novel friction shoes utilized in the device shown in Figures 1 and 2, and Figure 6 is a sectional view taken in the plane indicated by the line 6—6 of Figure 5.

Describing the structure in detail, my novel shock absorber comprises a cylinder casing 10 into which extends a plunger or piston rod 12 having an opening 14 therein for reception of suitable means connecting the rod to one of the sprung or unsprung members of a vehicle. The casing 10 is closed at its upper end by a shock absorber mounting end cap 16 fixed to the casing 10 preferably by welding as at 18 and provided with an opening 20 therein for accommodating suitable means for connecting the member 16 to the other of the sprung or unsprung members of the vehicle. The lower end of the casing has screw threaded thereon an end cap 20 having a central aperture 22 through which the plunger 12 extends.

The plunger 12 has an end portion 24 disposed intermediate opposite ends of the casing 10 and in threaded engagement as at 26 with a wedge element 28 which may be fixed against movement axially of the plunger by means of a nut 29 threaded on the end portion 24 and having engagement as at 30 with said element.

The wedge element 28 is shown in detail in Figures 3 and 4 and is somewhat similar in form to a hexagonal nut, said element having an opening 31 therein through which the end portion 24 of the plunger 12 extends for threaded engagement with said element. The wedge element is provided at opposite ends thereof with the hexagonal portions 32 and 34 to facilitate threading the element on the plunger. The element 28 is formed intermediate the end portions 32 and 34 with an outwardly projecting wedge portion 36 circumferentially thereof, said wedge portion 36 having the upper and lower reversely arranged diagonal portions 37 and 38 each presenting three V-shaped wedge surfaces 40, the wedge surfaces of the portion 37 being in complementary engagement as at 41 with a set of three friction shoes 42 and the wedge surfaces of the portion 38 being in complementary engagement as at 43 with a set of three friction shoes 44, the shoes 42 having seated thereagainst a coil spring 46 sleeved over the plunger 12 and compressed between the shoes 42 and the cap 16 for urging said shoes into wedge engagement as at 41 with said wedge element 28 and into frictional engagement as at 47 with the inner cylindrical surface 48 of the casing 10. A coil spring 50 is similarly compressed between the shoes 44 and the cap 20 for urging the shoes into wedge engagement as at 43 with the wedge element 28 and into frictional engagement as at 51 with the surface 48 of the casing 10.

The friction shoes are of similar design and, as shown in detail in Figures 5 and 6, each shoe is J-shaped in cross section and comprises a vertical friction wall 52 of generally curved cross section and presenting an outer arcuate friction surface 54 corresponding in curvature to the interior cylindrical friction surface 48 of the casing 10 and slidably engaging the same. Projecting outwardly at one end of the wall 52 of the shoe is a horizontal wall 56 providing a spring seat as at 57 for the associated spring and presenting at the inner extremity thereof a diagonal V-shaped wedge surface 58 for complementary engagement with one of the wedge surfaces on the wedge element 28. The horizontal wall 56 of each shoe of each set is provided with a vertical flange 60 projecting above the wedge surface 58 and defining with the wall 50 an arcuate cavity 62 for positioning one end of the spring associated therewith.

From the foregoing, it will be apparent that the shoes on opposite sides of and surrounding the wedge element 28 are urged into wedge engagement therewith and radially outwardly therewith and radially outwardly thereof into frictional engagement with the casing 10 with substantially equal force in the static condition of the shock absorber. Upon relative movement of the plunger and casing, it will be noted that one of the springs will be further compressed which results in the associated set of shoes being urged with greater force toward the casing to thereby increase the frictional engagement between the shoes and the casing in proportion to the extent of relative movement between the plunger and the casing.

In the operation of the device, the shock absorber parts are shown in Figure 1 in the position assumed when the sprung and unsprung members of a vehicle are in their normal static position at which time the friction shoes are urged into frictional engagement with the casing 10 by the springs 46 and 50 to exert a predetermined frictional restraint to initial movement of the vehicle members. Upon relative movement of the plunger and casing in either direction, one of the springs 46 or 48 will be compressed and thereby increase the frictional resistance of the associated shoes and casing, whereby said movement will be yieldingly restrained, the aforesaid frictional resistance being augmented by the shoes associated with the other spring and urged thereby into frictional engagement with the casing 10, the frictional resistance being in proportion to the extent of the relative movement of the plunger 12 and casing 10 and accordingly, as the extent of the approaching or separatory movement of the sprung and unsprung members increases, for example, due to impact and rebound, the increased frictional resistance to such movement will produce a retarding effect to thereby effectively control the aforesaid relative movement of these members.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. A shock absorber for controlling relative movements of the sprung and unsprung portions of a vehicle comprising a cylinder securable to one of said portions, a plunger extending and movable within said cylinder and securable to the other of said portions, said plunger comprising a wedge element rigidly secured thereto and having top and bottom V-shaped surfaces, a set of friction shoes having surfaces in complementary engagement with said top surfaces and friction faces in engagement with the inner surface of said cylinder, a set of friction shoes having surfaces in complementary engagement with said bottom surfaces and faces in engagement with the inner surface of said cylinder, and a pair of spaced coil springs, one of said springs extending between the surfaces and faces of said first-mentioned set of shoes and compressed between said set and said cylinder, and the other of said springs being sleeved over said plunger, extending between the surfaces and faces of said second-mentioned set of shoes and compressed between said set and said cylinder.

2. A shock absorber for controlling relative movements of the sprung and unsprung portions of a vehicle comprising a cylinder securable to one of said portions, a plunger extending and movable within said cylinder and securable to the other of said portions, said plunger comprising a wedge element rigidly secured thereto and having top and bottom wedge surfaces, a set of friction shoes having surfaces in complementary engagement with said top surfaces and friction faces in engagement with the inner surface of said cylinder, a set of friction shoes vertically spaced from said first-mentioned set and having surfaces in complementary engagement with said bottom surfaces and friction faces in engagement with the inner surface of said cylinder, and a pair of coil springs, one of said springs extending between the surfaces and faces of said first-mentioned set of shoes and compressed between said set and said cylinder, and the other of said springs being sleeved over said plunger, extending between the surfaces and faces of said second-mentioned set of shoes and compressed between said set and said cylinder.

3. A shock absorber for controlling relative movements of the sprung and unsprung portions of a vehicle comprising a cylinder securable to one of said portions, a plunger extending and movable within said cylinder and securable to the other of said portions, said plunger comprising a wedge element fixedly secured thereto and having top and bottom V-shaped surfaces, a set of friction shoes having surfaces in complementary engagement with said top surfaces and friction surfaces in engagement with the inner surface of said cylinder, a set of friction shoes having surfaces in complementary engagement with said bottom surfaces and friction faces in engagement with the inner surface of said cylinder, and a pair of coil spring, one of said springs being compressed between said first-mentioned set and said cylinder, and the other of said springs being sleeved over said plunger and compressed between said second-mentioned set and said cylinder.

4. A shock absorber for controlling relative movements of the sprung and unsprung portions of a vehicle comprising a casing securable to one of said portions, a plunger extending and movable within said casing and securable to the other of said portions, a wedge element fixed to said plunger within said casing, top and bottom wedge surfaces on said element, a set of friction shoes having surfaces in complementary engagement with said top surfaces, a set of friction shoes vertically spaced from said first-mentioned set and opposedly arranged with respect thereto and having surfaces in complementary engagement with said bottom surfaces, each set of said shoes having friction surfaces in engagement with said casing, a pair of coil springs, one of said springs being compressed between said first-mentioned set only and said casing, and the other of said springs being sleeved over said plunger and compressed between said second-mentioned set only and said casing.

5. A shock absorber for controlling movements of the sprung and unsprung portions of a vehicle comprising a casing securable to one of said portions, a member extending and movable within said casing and securable to the other of said portions, axially spaced sets of friction shoes in said casing, a wedge element fixed to said member extending between said sets and in wedge engagement therewith, and coil springs compressed between respective sets of shoes and said casing and operative to urge said shoes into wedge engagement with said wedge element and into frictional engagement with said casing.

6. A shock absorber comprising a casing having an internal friction surface, a member reciprocal within said casing, a wedge element fixed to said member and positioned adjacent said surface, said element having at opposite sides thereof reversely arranged wedge faces converging toward said surface, a plurality of friction shoes on each of said sides in wedge engagement with respective faces and in frictional engagement with said surface, and resilient means at opposite ends of said casing compressed between the adjacent shoes and said casing.

7. A snubber for controlling relative movements between the two members comprising a casing securable to one member and presenting an internal friction surface, a plunger securable to the other member and extending into said casing, a wedge within said casing fixedly secured to said plunger and presenting wedge faces at opposite sides thereof converging toward said surface, a plurality of shoes in wedge engagement with each face and in frictional engagement with said surface, said casing having abutments at opposite ends, one of said abutments having an opening accommodating said plunger therethrough, and spring means compressed between each abutment and the adjacent shoes.

WALTER H. BASELT.

REFERENCES CITED

The following references are of record in the file of this patent:

UNITED STATES PATENTS

| Number | Name | Date |
| --- | --- | --- |
| 1,174,269 | O'Connor | Mar. 7, 1916 |
| 1,292,539 | Todd | Jan. 28, 1919 |
| 1,329,795 | O'Connor | Feb. 3, 1920 |
| 1,366,422 | Seymour | Jan. 25, 1921 |
| 1,742,003 | O'Connor | Dec. 31, 1929 |
| 2,237,318 | Snyder | Apr. 8, 1941 |
| 2,238,083 | Sproul | Apr. 15, 1941 |
| 2,373,508 | Snyder | Apr. 10, 1945 |

FOREIGN PATENTS

| Number | Country | Date |
| --- | --- | --- |
| 416,857 | Great Britain | Sept. 24, 1934 |